United States Patent Office 3,245,931
Patented Apr. 12, 1966

3,245,931
COMPOSITIONS CONTAINING A WAX, AN ETHYLENE-VINYL ACETATE COPOLYMER, AND AN ALPHA METHYL STYRENE-VINYL TOLUENE COPOLYMER
David V. Matthew, Wilmington, Del., assignor to E. I. du Pont de Nemours and Company, Wilmington, Del., a corporation of Delaware
No Drawing. Filed Nov. 20, 1963, Ser. No. 325,164
6 Claims. (Cl. 260—28.5)

This invention relates to ethylene/vinyl acetate copolymer-petroleum wax compositions, and more particularly, to modified ethylene/vinyl acetate copolymer-petroleum wax compositions having hot tack.

It is known in the art that ethylene/vinyl acetate copolymers are very useful as petroleum wax additives. That is, ethylene/vinyl acetate copolymers may be blended with petroleum wax to effectively improve the flexibility, adhesiveness, heat-sealability, hardness, gloss, blocking temperature, and other desirable properties of the petroleum wax. Ethylene/vinyl acetate copolymer-petroleum wax blends have obtained considerable commercial acceptance for coating flexible cellulosic sheet materials, such as paper, paperboard, glassine, cellophane, and the like. Thus, such a flexible cellulosic sheet material may be coated with an ethylene/vinyl acetate copolymer-petroleum wax blend, and formed into a container such as a bag or carton, or the like by heat-sealing the overlapping surfaces together. The resulting container has an attractive, protective, highly moisture impermeable coating, and is held together by strong heat-seal bonds.

Ethylene/vinyl acetate copolymer-petroleum wax blends are satisfactory for use where the process of forming the container does not subject the heat-sealed bonds to any significant parting forces while the bonds are still hot. However, ethylene/vinyl acetate copolymer-petroleum wax compositions are deficient in hot tack properties. That is, these blends have very little adhesive strength when they are hot. The ethylene/vinyl acetate copolymer-petroleum wax blends known heretofore, are generally unsuitable for use as heat-sealable coatings where the heat-sealed bonds are subjected to any substantial parting forces while the bonds are still hot.

Consequently, ethylene/vinyl acetate copolymer-petroleum wax blends have not been useful heretofore as heat-sealable protective coatings on flexible cellulosic sheet materials which are processed by the so-called "form and fill" techniques provided by recently developed processes and apparatuses such as described in U.S. Patents 3,027,695 and 3,027,696, issued to Leasure. By such a process, packages are prepared, filled, and sealed by forming the sheet material into a tubular shape, heat-sealing the bottom edge of the tube thus formed, and then simultaneously heat-sealing the side seam of the package and filling it with the desired products, and thereafter heat-sealing the top edge of the package. Such processes are used to package a variety of different products including bakery goods, potato chips, cereals, and other foods and articles of manufacture including nuts and bolts and other similar hardware items, electronic components, toys and kits, and the like. The machines used in these form and fill processes operate at very high speeds, forming and filling from 30 to 300 units per minute. Since the heat-sealed bonds formed during such a process are subjected to considerable parting forces while still hot, it is imperative that the flexible cellulosic sheet material be coated with a heat-sealable composition which possesses sufficient hot tack to form a heat-sealed bond which will not separate during the forming and filling operation. It is desired to use an ethylene/vinyl acetate copolymer-petroleum wax blend to coat such sheet material to provide the excellent protective coatings obtainable therewith. However, as explained above, ethylene/vinyl acetate copolymer-petroleum wax blends known heretofore, possess insufficient hot tack for use in these processes.

An object of this invention is to provide an improved ethylene/vinyl acetate copolymer-petroleum wax composition. Another object is to provide an improved modified ethylene/vinyl acetate copolymer-petroleum wax composition which has satisfactory hot tack.

These and other objects are attained by the present invention which provides the composition comprising, by weight, (1) 25–40% of an ethylene/vinyl acetate copolymer having a copolymerized vinyl acetate content of 25–35% and a melt index of 1–10, (2) 12–20% of an alpha-methyl styrene/vinyl toluene copolymer having a copolymerized vinyl toluene content of 35–85% and a ball and ring softening point of 110–150° C., and (3) 40–63% of petroleum wax.

Although there are virtually an infinite number of various ethylene/vinyl acetate copolymers which are known to be effective wax additives, it has been found that only a precise class of ethylene/vinyl acetate copolymers are operable in the present invention. The ethylene/vinyl acetate copolymer must have a copolymerized vinyl acetate content of 25–35% by weight or preferably 26–30%, and correspondingly a copolymerized ethylene content of 65–75% or preferably 70–74%, in order to obtain the requisite hot tack. This precise copolymerized vinyl acetate content range is also necessary to impart other desirable properties to the resulting compostion, including optimum flexibility, water vapor impermeability, gloss, adhesiveness, heat-sealability, and blocking temperature. Ethylene/vinyl acetate copolymers containing minor amounts of other copolymerizable monomers such as ethylenically unsaturated carboxylic acids are suitable for use in this invention.

The molecular weight of the ethylene/vinyl acetate copolymer is also critical in this invention. The molecular weight of these copolymers is conveniently measured in terms of melt index as determined by ASTM method D–1238–57T. The ethylene/vinyl acetate copolymer of this invention must have a melt index of 1–10. If the ethylene/vinyl acetate copolymer has a melt index of greater than 10, the resulting composition has insufficient hot tack. If the melt index of ethylene/vinyl acetate copolymer is less than 1, the resulting composition is excessively viscous and cannot be coated onto the flexible cellulosic sheet material with the coating machines commonly used in the art. It is preferred that the ethylene/vinyl acetate copolymer have a melt index of 2–4.

The ethylene/vinyl acetate copolymers of this invention may be prepared by any convenient process such as disclosed in U.S. Patent 2,200,429, issued to Perrin et al., and U.S. Patent 2,703,794, issued to Roedel.

There also are many alpha-methyl styrene and vinyl toluene homopolymers and copolymers. However, only a precise class of alpha-methyl styrene/vinyl toluene copolymers are operable in this invention. Specifically, the alpha-methyl styrene/vinyl toluene copolymer must have a copolymerized vinyl toluene content of 35–85%, by weight, or preferably 60–80%, and correspondingly a copolymerized alpha-methyl styrene content of 15–65%, or preferably 20–40%. If this copolymer contains less than 35% of copolymerized vinyl toluene, the copolymer does not dissolve or disperse sufficiently and a gritty composition is thereby obtained which provides a coating that is undesirably rough. Moreover, if such a copolymer containing less than 35% of copolymerized vinyl toluene is used, the resulting composition has inadequate hot tack. Alpha-methyl styrene/vinyl toluene copolymers containing over 85% of copolymerized vinyl toluene are insufficiently compatible with the other components of the composition of this invention.

The molecular weight of the alpha-methyl styrene/vinyl toluene copolymer is critical to this invention. The molecular weight of this copolymer is conveniently expressed in terms of the ball and ring softening point as determined in accordance with ASTM method E-28-58T. The alpha-methyl styrene/vinyl toluene must have a ball and ring softening point of 110–150° C. If the ball and ring softening point of this copolymer is less than 110° C., the resulting composition does not have adequate hot tack. Alpha-methyl styrene/vinyl toluene copolymers having ball and ring softening points greater than 150° C. impart excessive viscosity to the resulting composition. It is preferred that this copolymer have a ball and ring softening point of 115–125° C.

Any convenient process may be employed to prepare the alpha-methyl styrene/vinyl toluene copolymers of this invention, such as disclosed in U.S. Patent 3,000,868, issued to Powers.

The term "petroleum wax" as used herein refers to both paraffin and microcrystalline waxes. Paraffin wax is a mixture of solid hydrocarbons derived from the overhead wax distillate fraction obtained from the fractional distillation of petroleum. After purification, the paraffin wax contains hydrocarbons that fall within the formula $$C_{23}H_{48}\text{-}C_{35}H_{72}$$

It is a substantially colorless, hard, and translucent material usually having a melting point of about 125–165° F. Microcrystalline wax is obtained from the nondistillable still residues from the fractional distillation of petroleum. It differs from paraffin wax in having branched hydrocarbons of higher molecular weight. It is considerably more plastic than paraffin wax and usually has a melting point of about 150–200° F. Although either paraffin or microcrystalline wax may be used in the composition of this invention, it is preferred to use paraffin wax or a mixture of paraffin and microcrystalline wax containing a predominant proportion of paraffin wax (on the order of about 75% by weight of the total amount of petroleum wax).

It is possible to combine ethylene/vinyl acetate copolymers, alpha-methyl styrene/vinyl toluene copolymers, and petroleum wax in all proportions. However, in accordance with the present invention, these components must be combined in certain critical proportions. Specifically, the composition must contain 25–40% by weight of the ethylene/vinyl acetate copolymer, 12–20% by weight of the alpha-methyl styrene/vinyl toluene copolymer, and 40–63% by weight of the petroleum wax. If the proportion of either the ethylene/vinyl acetate copolymer or the alpha-methyl styrene/vinyl toluene copolymer exceeds its respective specified maximum amount, the composition is excessively viscous. If the proportions of these copolymers are less than their respective specified minimum amounts, the resulting composition does not have adequate hot tack. Optimum properties are obtained when the composition contains about 30% by weight of the ethylene/vinyl acetate copolymer, about 18% by weight of the alpha-methyl styrene/vinyl toluene copolymer, and about 52% by weight of paraffin wax.

The composition of this invention may be prepared by any convenient method such as by hot-mixing the component in a heated pot equipped with a suitable agitator, or in a Banbury mixer, on a two-roll mill, in a compounding extruder or other such equipment.

Additional materials may be added to the composition of this invention such as inert fillers, pigments, dyes, antioxidants, and the like so long as the essential characteristics of this composition are not significantly altered.

This invention is further illustrated by the following examples. In these examples, the compositions tested were prepared by first melting the petroleum wax in a heated container affixed with an agitator. The ethylene/vinyl acetate copolymer was added to the molten wax and agitated until it appeared to be dissolved. Then the third polymer (e.g., alpha-methyl styrene/vinyl toluene copolymer, or other polymer as shown in the examples) was added with agitation. The molten mixture was agitated for approximately two hours. The resulting molten composition was then coated onto 30 lb./3000 sq. ft. ream glassine to give a uniform coating weight of about 8 lb./3000 sq. ft. ream, using a six-inch kiss and scrape coater, following the procedure described by Lamar et al., "Journal of the Technical Association of the Pulp and Paper Industry," May, 1962, vol. 45, No. 5, p. 401. For each test of these examples, a sample of the glassine, coated with the composition under evaluation, was cut into a rectangle measuring 3 inches by about 12 inches. This rectangle was formed into a loop and the ends thereof were heat-sealed, coated surfaces together, using a heat-sealer at 180° F. under 30 lb./sq. in. pressure for a dwell time of from 0.5 to 1 second to form a heat-seal bond about 0.25 to 0.5 inch wide across the entire end of the loop, which was then permitted to cool thoroughly. A calibrated spring device was used to evaluate the hot tack properties of the composition. This device was constructed from a rectangular sheet of spring steel, 0.007 inch thick, measuring 3 inches by 8 inches. Matching sections were cut out of both 8-inch sides of this spring steel sheet, each roughly corresponding to the segment on the chord of circle having a radius of approximately 4 inches, with the chord lying along the plane of the 8-inch side. These matching cut-out sections were arranged directly opposite each other to provide a center width therebetween of about ½ inch. This device was calibrated using a standard Instron tester to provide a parting force of 0.5–0.6 ounce per inch of seal when the device was looped with the ends touching and then released. Such devices can be prepared from various types of spring steel, calibrated to provide the desired parting force by varying the areas of the matching cut-out sections. To evaluate the hot tack properties of the composition, the calibrated spring device was looped and placed inside the loop of coated glassine with the ends of the device pointing toward the cooled heat-seal bond of the coated glassine. The loop of glassine was then inserted into the jaws of the heat-sealer to form a second heat-seal bond about ⅛ to ¾ inch away from the first heat-seal bond, and in abutting contact with the ends of the calibrated spring device. This second bond was formed at 180° F., under 30 lb./sq. in. pressure for a dwell time of 0.5–1 second, at which time the jaws of the heat-sealer were released immediately, subjecting the second heat-seal bond to the parting force of 0.5–0.6 ounce per inch of seal imparted by the calibrated spring steel device. The bond was then visually examined to determine what portion of the bond remained intact in terms of percent of the original bond area. In the examples, hot tack of the compositions are rated as "excellent," "good," "unsatisfactory," and "failure" according to the percent of failure of bond as shown in the following table:

Excellent=90–100% hold
Good=75–90% hold
Unsatisfactory=25–75% hold
Failure=0–25% hold As determined by other experiments using commercial form and fill machines in actual commercial operation, a composition having a hot tack of "excellent" or "good" according to the above-described test is commercially operable, but a composition having a hot tack of "unsatisfactory" or "failure" is not useful. In these examples, ethylene/vinyl acetate copolymer is abbreviated "E/VA" and alpha-methyl styrene/vinyl toluene copolymer is abbreviated, "α-MS/VT." Percentages are stated in terms of percent by weight.

*Example 1*

This example illustrates several compositions which are suitable for use as heat-sealable, protective coatings on flexible cellulosic substrates to be processed by form and fill machines. The ethylene/vinyl acetate copolymer used in this example had a copolymerized vinyl acetate content of 28% and a melt index of 3. The alpha-methyl styrene/vinyl toluene copolymer had a copolymerized vinyl toluene content of 75% and a ball and ring softening point of 120° C. The petroleum wax used in Tests 1–3 of this example was a paraffin wax having a manufacturer's specified melting point of 143–150° C., and the petroleum wax used in Tests 4 and 5 was another paraffin wax having a manufacturer's specified melting point of 148° C. The results of this example are shown in Table I:

TABLE I

| Test No. | Composition | | | Viscosity, cp., at 120° C. | Hot Tack |
|---|---|---|---|---|---|
| | Percent E/VA | Percent α-MS/VT | Percent Wax | | |
| 1 | 30 | 12 | 58 | 7,000 | Good. |
| 2 | 30 | 15 | 55 | 8,400 | Do. |
| 3 | 30 | 18 | 52 | 14,000 | Excellent. |
| 4 | 30 | 20 | 50 | 25,700 | Do. |
| 5 | 40 | 20 | 40 | 92,000 | Do. |

As shown by these data, all of the compositions here evaluated have sufficient hot tack to be entirely suitable for use as coating on sheet material for processing on form and fill machines. It will be particularly noted that a composition comprising about 30% of ethylene/vinyl acetate copolymer, about 18% of α-methyl styrene/vinyl toluene copolymer and about 62% of petroleum wax, as shown in Test 3, is an especially preferred composition. This compoistion possessed "excellent" hot tack at a desirable viscosity. The composition evaluated in Test 5 possessed "excellent" hot tack, but also had a very high viscosity. Thus, this composition used in Test 5 contained the maximum permissible amounts of ethylene/vinyl acetate copolymer (40%) and α-methyl styrene/vinyl toluene copolymer (20%).

*Example 2*

This example further illustrates the especially preferred composition of this invention, demonstrating the effect of the copolymerized vinyl toluene content of the alpha-methyl styrene copolymer. The results obtained in Test 3 of Example 1 are used in the present example as Test 1. In Test 2, 18% of an alpha-methyl styrene/vinyl toluene copolymer having a copolymerized vinyl toluene content of 45% and a ball and ring softening point of 120° C. was blended with 30% of the ethylene/vinyl acetate copolymer used in Example 1 and 52% of the paraffin wax having a melting point of 148° C. (i.e., same proportions as used in the composition of Test 1 wherein the alpha-methyl styrene/vinyl toluene copolymer had a vinyl toluene content of 75%). The results of this example are shown in Table II:

TABLE II

| Test No. | Percent Vinyl Toluene of α-MS/VT | Viscosity, cp., at 120° C. | Hot Tack |
|---|---|---|---|
| 1 | 75 | 14,000 | Excellent. |
| 2 | 45 | 12,000 | Good. |

These data show that although an alpha-methyl styrene/vinyl toluene copolymer having a copolymerized vinyl toluene content of 45% is entirely satisfactory as contemplated in this invention, it is necessary to have a copolymerized vinyl toluene content on the order of 70 to 80% in order to obtain the especially preferred composition of this invention.

*Example 3*

This example illustrates the effect of using less than the specified minimum amount of 12% of alpha-methyl styrene/vinyl toluene copolymer. The composition evaluated contained 30% of the ethylene/vinyl acetate copolymer used in Example 1, 10% of the alpha-methyl styrene/vinyl toluene copolymer used in Example 1 and 60% of the paraffin wax having a melting point of 148° C. This composition had a hot tack of "unsatisfactory."

*Example 4*

In this example a composition consisting of 30% of the ethylene/vinyl acetate copolymer used in Example 1, 18% of an alpha-methyl styrene homopolymer having a ball and ring softening point of 210° C., and 52% of the paraffin wax having a melting point of 148° C., was evaluated. In spite of the fact that this homopolymer had a very high softening point, this composition had a hot tack of "unsatisfactory," demonstrating that an alpha-methyl styrene homopolymer is not operable in this invention. Moreover, this homopolymer did not completely dissolve or disperse into the composition. The resulting coating was unacceptably rough and gritty. It is necessary to use an alpha-methyl styrene/vinyl toluene copolymer having a copolymerized vinyl toluene content of 35 to 85%.

*Example 5*

This example illustrates the importance of using an alpha-methyl styrene/vinyl toluene copolymer having at least the specified minimum ball and ring softening point of 110° C. A composition of 30% of the ethylene/vinyl acetate copolymer used in Example 1, 18% of an alpha-methyl styrene-vinyl toluene copolymer having a copolymerized vinyl toluene content of 75% and a ball and ring softening point of 100° C., and 52% of the paraffin wax having a melting point of 143–150° C., was evaluated. This composition had a hot tack of "unsatisfactory."

*Example 6*

This example illustrates the effect of using an ethylene/vinyl acetate copolymer having a melt index of greater than the specified maximum of 10. In all of the tests of this example, the composition evaluated contained 30% of an ethylene/vinyl acetate copolymer having a copolymerized vinyl acetate content of 28%, 18% of the alpha-methyl styrene/vinyl toluene copolymer used in Example 1, and 52% of the paraffin wax having a melting point of 143–150° C. In Test 1 the ethylene/vinyl acetate copolymer had a melt index of about 150, in Test 2 the ethylene/vinyl acetate copolymer had a melt index of 16, and in Test 3, the ethylene-vinyl acetate copolymer had a melt index of 3 (Test 3 here being a reproduction of Test 3 of Example 1). The results of this example are shown in Table III.

TABLE III

| Test No. | Melt Index of E/VA | Viscosity, cp., at 120° C. | Hot Tack |
|---|---|---|---|
| 1 | 150 | 1,300 | Failure. |
| 2 | 16 | 1,500 | Do. |
| 3 | 3 | 14,000 | Excellent. |

*Example 7*

This example illustrates the criticality of using an ethylene/vinyl acetate copolymer having the requisite copolymerized vinyl acetate content of 25–35%. A composition of 30% of an ethylene/vinyl acetate copolymer having a copolymerized vinyl acetate content of 18% and a melt index of 2.5, 18% of the alpha-methyl styrene/vinyl toluene copolymer used in Example 1, and 52% of the paraffin wax having a melting point of 143–150° C., was evaluated. This composition has a hot tack of "failure."

This invention has been described in considerable detail. However, those skilled in the art will recognize many obvious variations and modifications which can be made

I claim:
1. The composition comprising, by weight, (1) 25–40% of an ethylene/vinyl acetate copolymer having a copolymerized vinyl acetate content of 25–35% and a melt index of 1–10, (2) 12–20% of an alpha-methyl styrene/vinyl toluene copolymer having a copolymerized vinyl toluene content of 35–85% and a ball and ring softening point of 110–150° C., and (3) 40–63% of petroleum wax.

2. The composition of claim 1 wherein the said petroleum wax is paraffin wax.

3. The composition comprising, by weight (1) about 30% of an ethylene/vinyl acetate copolymer having a copolymerized vinyl acetate content of 26–30% and a melt index of 2–4, (2) about 18% of an alpha-methyl styrene/vinyl toluene copolymer having a copolymerized vinyl toluene content of 70–80% and a ball and ring softening point of 115–125° C., and (3) about 52% of paraffin wax.

4. A heat-sealable flexible sheet material having coated on the surface thereof the composition of claim 1.

5. A heat-sealable flexible sheet material having coated on the surface thereof the composition of claim 2.

6. A heat-sealable flexible cellulosic sheet material having coated on the surface thereof the composition of claim 3.

References Cited by the Examiner
UNITED STATES PATENTS

| | | | |
|---|---|---|---|
| 2,526,654 | 10/1950 | Gleason et al. | 260—28.5 |
| 3,000,868 | 9/1961 | Powers | 260—88.2 |
| 3,025,167 | 3/1962 | Butler | 260—28.5 |
| 3,175,986 | 3/1965 | Apikos et al. | 260—28.5 |

OTHER REFERENCES

Boundy et al., "Styrene—Its Polymers, Copolymers and Derivatives," Monograph Series No. 115, Reinhold Publishing Corp., New York, 1952, pages 1241–1244.

MORRIS LIEBMAN, *Primary Examiner.*

B. A. AMERNICK, *Assistant Examiner.*